No. 672,603. Patented Apr. 23, 1901.
A. S. HUBBARD & R. N. CHAMBERLAIN.
SYSTEM OF ELECTRIC DISTRIBUTION.
(Application filed Mar. 13, 1901.)
(No Model.)

Witnesses:
Henry L. Dick.
F. F. Scheyinger.

Albert S. Hubbard
Rufus N. Chamberlain
Inventors
By Wilhelm Bonner.
Attorneys

UNITED STATES PATENT OFFICE.

ALBERT S. HUBBARD, OF BELLEVILLE, NEW JERSEY, AND RUFUS N. CHAMBERLAIN, OF DEPEW, NEW YORK, ASSIGNORS TO GOULD STORAGE BATTERY COMPANY, OF NEW YORK, N. Y.

SYSTEM OF ELECTRIC DISTRIBUTION.

SPECIFICATION forming part of Letters Patent No. 672,603, dated April 23, 1901.

Application filed March 13, 1901. Serial No. 50,903. (No model.)

*To all whom it may concern:*

Be it known that we, ALBERT S. HUBBARD, a resident of Belleville, in the county of Essex and State of New Jersey, and RUFUS N. CHAMBERLAIN, a resident of Depew, in the county of Erie and State of New York, citizens of the United States, have invented new and useful Improvements in Systems of Electric Distribution, of which the following is a specification.

This invention relates to that class of systems of electrical distribution in which a storage battery is combined with a dynamo in such manner that the battery receives the excess of output of the dynamo when the output exceeds the load on the line, while the battery assists the dynamo in supplying current to the line when the load exceeds the output of the dynamo, and in which the battery is provided with end cells and a switch by which cells can be cut in or out, as may be necessary to maintain a substantially uniform action of the apparatus under varying conditions of load and dynamo output.

One object of our invention is to provide simple and efficient means for automatically controlling the cutting in and out of end cells as the conditions of load and dynamo output change. To that end we provide counteracting coils which control the field of a dynamo by which the motor of the end-cell switch is actuated in such manner that this motor is kept at rest when an equilibrium exists, while when the equilibrium is disturbed the motor is actuated in the proper direction to cut end cells in or out, as the case may be, until the equilibrium is restored.

Another object of our invention is to provide simple and efficient means for charging the end cells of the battery.

Figure 1:
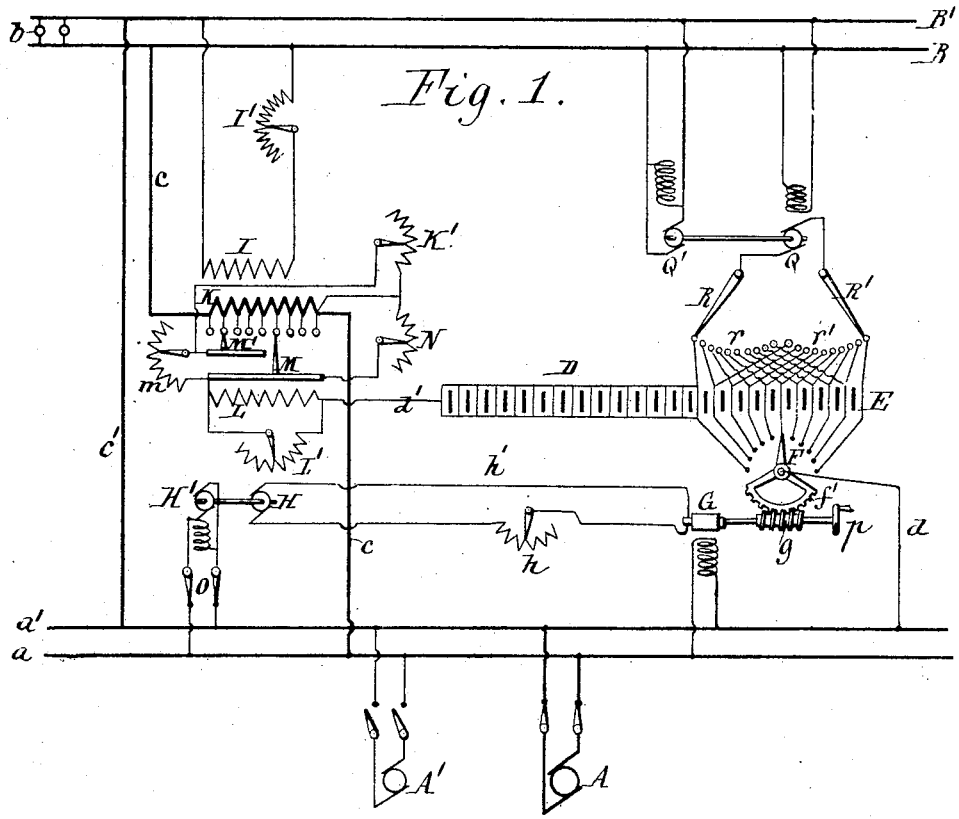
Figure 2:
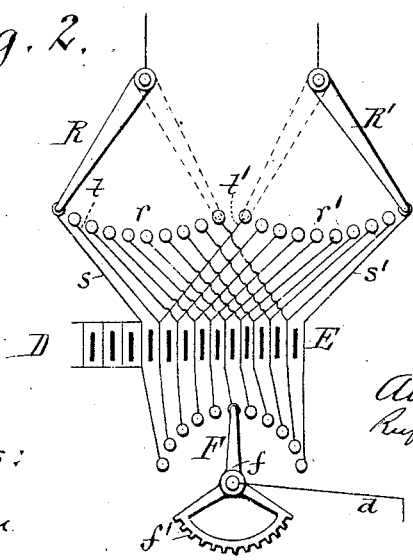

In the accompanying drawings, Figure 1 is a diagrammatic view of a system of electrical distribution provided with our improvements. Fig. 2 is a detached diagrammatic view showing the switches and connections for charging the end cells.

Like letters of reference refer to like parts in both figures.

A represents a large main dynamo, and A' a small main dynamo, both connected in the ordinary manner with the usual bus-bars $a$ $a'$. A single dynamo or more than two dynamos may be used, as circumstances may render necessary.

B B' represent the wires of the main line, and $b$ translating devices of any kind arranged between these wires.

$c$ represents a wire connecting one terminal of the main dynamo through the bus-bar $a$ with the wire B of the main line, and $c'$ represents a wire connecting the wire B' of the main line with the other terminal of the dynamo through the bus-bar $a'$. Either dynamo A or A' operates as a main dynamo for supplying the main line, a large dynamo A being used in some cases when a heavy current is required and a smaller dynamo A' when a lighter current suffices.

D represents a storage battery having a series of end cells E, which can be cut into or out of circuit by an automatic switch F. This switch is connected by a wire $d$ with the bus-bar $a'$, and the opposite pole of the battery is connected by a wire $d'$ with the wire $c$. The automatic switch F may be of any suitable construction, that indicated in the drawings involving a pivoted switch-lever $f$, provided with a gear-segment $f'$, in which engages a worm $g$. The latter is actuated by a motor G, which is supplied with current from an auxiliary dynamo H, driven by a motor H' or other suitable means. The action of this switch-actuating dynamo is automatically controlled in such a way that this dynamo is rendered ineffective and generates no current and does not actuate the switch-motor when the output of the main dynamo is equal to the load on the main line, while when the load increases beyond the capacity of the main dynamo and the battery discharges and augments the current or when the load drops below the output of the main dynamo and the battery receives current therefrom the switch-actuating dynamo is rendered effective in one or the other direction and generates a current which actuates the switch-motor in the proper direction to cut in cells or cut out cells, as the case may be. To effect this automatic regulation, the action of the switch-dynamo H is controlled by three counteracting coils I K L, which are wound upon the field-magnets of the switch-dynamo or otherwise arranged in such proximity to the armature of this dynamo that this armature is placed under the influence of those coils. The coil I is formed in a shunt-wire $i$, which is connected across the wires B B' of the main line or across the wires $c\,c'$, or arranged in any other suitable manner so as to conduct part of the main current. The coil K is formed in series in the wire $c$, leading from the main dynamo to the main line. The coil L is formed in the wire $d'$, connecting one of the terminals of the battery with the wire $c$, preferably with the coil K in the same. The shunt-coil I and the series coil K are so wound and connected that the magnetic effect of one is opposed to that of the other. The battery-coil L is so wound and connected that it forms a magnetic continuation of the series coil K in the direction in which the current passes from the main dynamo A or A' to the battery and charges the same. The effect of the shunt-coil I upon the series coil K is regulated by a variable resistance I', according to the capacity of the dynamo or dynamos in use, so that these two coils normally balance each other.

M is a switch which connects the battery-wire $d'$, in which the battery-coil is arranged, with the series coil K in such manner that a greater or less portion of this coil can be placed in circuit with the battery. By adjusting this switch the working of the battery and the dynamo with reference to the external load is regulated. The smaller the amount of series coil K which is in circuit with the battery the greater is the proportion of the load which is taken by the battery, and vice versa. An auxiliary switch M' is connected by one contact with the series coil K, between the switch M and that part of the wire $c$ which leads from the series coil to the main line. The other contact of this auxiliary switch M' is connected with the battery-wire $d'$ between the battery-coil L and the switch M. By means of this auxiliary switch a division can be made of that part of the series coil which is undivided by the switch M. A variable shunt-resistance $m$ is arranged between the battery-coil L and the auxiliary switch M', whereby the portion of the series coil K between the switches M and M' can be regulated.

The regulating effect of the entire series coil K can be adjusted by a variable shunt-resistance K'. When a dynamo of large capacity is used, this shunt-resistance is reduced, and vice versa.

The battery-coil L is provided with a variable shunt-resistance L', by which the rate of discharge of the battery can be adjusted.

A variable resistance $h$ is arranged in the line $h'$, which connects the switch-dynamo H with the switch-motor G. By means of this resistance the speed of the motor and the rapidity of starting can be nicely regulated.

A variable shunt-resistance N is provided for regulating that portion of the series coil K which lies between the switch M and the main dynamo.

Assuming that the output of the main dynamo is equal to the load on the main line, the current passes from one terminal of the dynamo through the wire $c$, series coil K, line B, translating device $b$, line B', and wire $c'$ back to the opposite terminal of the dynamo. A part of the current also passes through the shunt-coil I. Under these conditions the effect of the shunt-coil upon the field of the switch-dynamo H balances or neutralizes the effect of the series coil K, whereby the switch-dynamo is rendered ineffective and generates no current, although it is rotated by the motor H'. The end-cell switch F is not disturbed, and the battery neither charges nor discharges. When the load on the main line increases above the output of the main dynamo, the battery discharges to make up the deficiency and augments the current passing through the series coil K to the main line. This augmented current passing through the series coil K causes the same to preponderate in effect over that of the shunt-coil I upon the field of the switch-dynamo H, rendering the latter effective and causing the generation of a current in such a direction that the motor G is actuated in the proper direction to shift the switch F forward to cut in more cells, thereby increasing the electromotive force of the battery until an equilibrium has been established. The battery-current in discharging flows from one terminal of the battery through the wire $d'$, coil L, switch M, part of series coil K, wire $c$, line B, translating device $b$, line B', wire $c'$, wire $d$, and automatic switch F to the opposite terminal of the battery. The battery-current in passing through the coil L neutralizes to a greater or less extent the excess effect of the series coil K over the shunt-coil I. When a sufficient number of cells have been cut into the circuit to raise the voltage so high that the battery supplies the excess load, the effect of the battery-coil L completely neutralizes the excess excitation produced by the series coil K. The switch-dynamo H is now rendered ineffective, the switch-motor G comes to rest, the switch remains in its position, and the battery discharges the current required by the excess load on the line. Should the discharge of the battery continue for a considerable time, the battery voltage drops and the current output is reduced. The effect of the battery-coil L is correspondingly reduced and the effect of the series coil K again preponderates, whereby the switch-dynamo is again rendered effective and the switch-motor is again actuated to cut more cells into the circuit until the equilibrium is restored, when the coils again neutralize each other and the switch-motor again comes to rest. When the load on the main line drops below the output of the main dynamo, the excess output of the latter passes into the battery, flowing from one terminal of the dynamo through the wire $c$, part of series coil K, switch M, battery-coil L, battery, automatic switch F, and wire $d$ to opposite terminal of dynamo. A reduction of the load on the main line causes a reduction in the effect of the series coil K and a preponderance in the effect of the shunt-coil I. This causes a reversal in the field of the switch-dynamo H, whereby the latter is caused to generate a current in the opposite direction— that is to say, of such a polarity that it rotates the switch-motor G in that direction in which it shifts the automatic switch backward to cut out cells until the battery is reduced to the point at which it receives the excess output of the dynamo. Under this condition the current passes through the battery-coil L in such a direction as to assist the magnetizing effect of the series coil K until the combined effect of the coils K and L neutralizes the effect of the shunt-coil I, when the switch-dynamo again ceases to generate and the switch-motor stops. If the charge continues for a considerable length of time, the counter electromotive force of the battery increases as the charge proceeds, whereby the current entering the battery through the coil L is correspondingly reduced, thus reducing the combined effect of the coils K and L. The shunt-coil I now again preponderates, and the switch-dynamo is again rendered effective, driving the switch-motor in the proper direction to cut in more cells until the equilibrium is restored. When the battery has been fully charged, the circuit between the switch-dynamo and the switch-motor is opened and the automatic switch F is adjusted by hand to cut in sufficient cells to make the electromotive force of the main dynamo and the battery equal. If the under-load on the main line continues for some length of time, it is economical and advantageous to shut down the main dynamo and supply the main line from the battery alone. Under these conditions the current flows from one terminal of the battery through the coil L, switch M, part of coil K, and wire $c$ to the main line and back through the wire $c'$, wire $d$, and switch F. When the current is supplied from the battery only, the switch-motor H' is stopped by opening its switch O, and the regulation of the battery is effected by shifting the automatic switch F by hand, the switch being provided with a hand-wheel $p$ for this purpose.

Q represents an auxiliary dynamo for charging the end cells of the battery independently of the main cells thereof. This dynamo is driven by any suitable means—for instance, a motor Q', which may be driven from the main line, as indicated in the drawings, or from the battery, or from any other available source.

$r\ r'$ represent two series of charging-contacts which are connected with the end cells, and R R' are two switch-levers connected with the terminals of the auxiliary generator and so arranged that the lever R can be connected with either of the contacts $r$ and the lever R' with either of the contacts $r'$. The first end cell of the series—in other words, the end cell nearest the body or main cells of the battery—is connected only with the first contact of the first series $r$ by a conductor $s$. The last end cell is connected only with the last contact of the second series $r'$ by a conductor $s'$. The intermediate end cells are each connected with one contact of each series by two conductors $t\ t'$. By this arrangement of contacts and switches the charging-dynamo can be connected with any single end cell or with any two or more adjoining end cells, as may be desired.

We claim as our invention—

1. The combination with the main line, a main generator supplying current to the same, a storage battery, a switch for cutting cells in or out, and a motor for shifting said switch, of a generator supplying current to said motor, and counteracting coils arranged to magnetically control the field of said switch-actuating generator, substantially as set forth.

2. The combination with the main line, a main generator supplying current to the same, a storage battery, a switch for cutting cells in or out, a motor for shifting said switch and a generator supplying current to said motor, of a coil arranged in series with the main generator and the main line, a counteracting shunt-coil arranged across the main line, and a battery-coil arranged between the series coil and the battery, said coils being arranged to magnetically control the field of said switch-actuating generator, substantially as set forth.

3. The combination with the main line, a main generator supplying current to the same, a storage battery arranged in parallel therewith, a switch for cutting cells in or out, a motor for shifting said switch and a generator supplying current to said motor, of a coil arranged in series with the main generator and the main line, a counteracting shunt-coil arranged across the main line, and a coil connecting one of the terminals of the battery with the main generator and wound to form a magnetic continuation of said series coil in the direction in which the current flows through said series coil and said battery-coil when the main generator charges the battery, said counteracting coils being arranged to magnetically control the field of said switch-actuating generator, substantially as set forth.

4. The combination with the main line, a main generator supplying current to the same, a storage battery, a switch for cutting cells in or out, and a motor for shifting said switch, of a coil arranged in series with the main generator and main line, a variable resistance connected with opposite ends of said coil, a counteracting shunt-coil arranged across the main line, and a generator which supplies current to said motor and which has its field magnetically controlled by said counteracting coils, substantially as set forth.

5. The combination with the main line, a main generator supplying current to the same, a storage battery, a switch for cutting cells in or out, and a motor for shifting said switch, of a coil arranged in series with the main generator and main line, a counteracting coil arranged in a shunt-line across the main line, a variable resistance in said shunt-line, and a generator which supplies current to said motor and which has its field magnetically controlled by said counteracting coils, substantially as set forth.

6. The combination with the main line, a main generator supplying current to the same, a storage battery, a switch for cutting cells in or out, and a motor for shifting said switch, of a coil arranged in series with the main generator and main line, a coil arranged between said series coil and said battery, a switch connecting said series coil with said battery-coil for cutting out part of the series coil, a shunt-coil counteracting said series coil and arranged across the main line, and a generator which supplies current to said motor and which has its field magnetically controlled by said counteracting coils, substantially as set forth.

7. The combination with the main line, a main generator supplying current to the same, a storage battery, a switch for cutting cells in or out, and a motor for shifting said switch, of a coil arranged in series with the main generator and main line, a coil arranged between said series coil and said battery, a switch connecting said series coil with said battery-coil for cutting out part of the series coil, an auxiliary switch also connecting said series coil with said battery-coil, a shunt-coil counteracting said series coil and arranged across the main line, and a generator which supplies current to said motor and which has its field magnetically controlled by said counteracting coils, substantially as set forth.

8. The combination with the main line, a main generator supplying current to the same, a storage battery, a switch for cutting cells in or out, and a motor for shifting said switch, of a coil arranged in series with the main generator and main line, a coil arranged between said series coil and said battery, a variable resistance connected with opposite ends of said battery-coil, a shunt-coil counteracting said series coil and arranged across the main line, and a generator which supplies current to said motor and which has its field magnetically controlled by said counteracting coils, substantially as set forth.

9. The combination with a main generator, a main line, and a storage battery arranged in parallel therewith and having end cells provided with separate charging-contacts, of an auxiliary generator for charging the end cells, and means whereby the terminals of said auxiliary generator can be connected with the contacts of the end cells, thereby charging the same independently of the main cells of the battery, substantially as set forth.

10. The combination with a main generator, a main line, and a storage battery arranged in parallel therewith and having a series of end cells, of two series of charging-contacts for said end cells, the first end cell being connected with the first contact of the first series, the last end cell with the last contact of the second series and the intermediate end cells each with two contacts, one of each series, an auxiliary generator for charging the end cells, and two switches, one arranged between each terminal of said auxiliary generator and the corresponding series of contacts, substantially as set forth.

Witness my hand this 28th day of February, 1901.

ALBERT S. HUBBARD.

Witnesses:
 WILLIAM S. GOULD,
 CHARLES M. GOULD.

Witness my hand this 1st day of March, 1901.

R. N. CHAMBERLAIN.

Witnesses:
 JNO. J. BONNER,
 C. B. HORNBECK.